United States Patent
Zhao et al.

(10) Patent No.: US 12,356,378 B2
(45) Date of Patent: Jul. 8, 2025

(54) COMMUNICATION METHODS AND DEVICES FOR SIDELINK

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/647,688

(22) Filed: Apr. 26, 2024

(65) Prior Publication Data
US 2024/0276467 A1    Aug. 15, 2024

Related U.S. Application Data

(63) Continuation of application No. 17/532,738, filed on Nov. 22, 2021, now Pat. No. 12,004,132, which is a continuation of application No. 17/201,058, filed on Mar. 15, 2021, now Pat. No. 11,202,287, which is a continuation of application No. PCT/CN2018/106333, filed on Sep. 18, 2018.

(51) Int. Cl.
*H04W 72/0446* (2023.01)
*H04W 4/40* (2018.01)
*H04W 8/22* (2009.01)

(52) U.S. Cl.
CPC ......... *H04W 72/0446* (2013.01); *H04W 4/40* (2018.02); *H04W 8/22* (2013.01)

(58) Field of Classification Search
CPC ...... H04W 72/0446; H04W 4/40; H04W 8/22
See application file for complete search history.

(56) References Cited

U.S. PATENT DOCUMENTS

2016/0066337 A1*  3/2016  Sartori ............... H04W 76/14
                                                          370/329
2018/0367283 A1*  12/2018 Huang ............... H04L 1/1861

FOREIGN PATENT DOCUMENTS

WO    WO-2018080566 A1 *  5/2018

OTHER PUBLICATIONS

IPA, Office Action for AU Application No. 2018442180, May 7, 2024.

* cited by examiner

*Primary Examiner* — Melvin C Marcelo
(74) *Attorney, Agent, or Firm* — Hodgson Russ LLP

(57) ABSTRACT

Communication methods and devices for a sidelink (SL) are provided. A communication method for an SL includes the following. A first terminal device obtains a first transmission resource. The first terminal device sends first feedback information to a second terminal device, by using the first transmission resource. A time unit in which the first transmission resource is located is not used for transmitting data by the first terminal device to at least one third terminal device or the second terminal device, where the first terminal device, the second terminal device, and the at least one third terminal device belong to a first group.

16 Claims, 5 Drawing Sheets

500

A SECOND TERMINAL DEVICE SENDS A FIRST MESSAGE TO A FIRST TERMINAL DEVICE — 510

THE SECOND TERMINAL DEVICE RECEIVES FIRST FEEDBACK INFORMATION, WHICH IS SENT BY THE FIRST TERMINAL DEVICE USING A FIRST TRANSMISSION RESOURCE, WHERE THE FIRST FEEDBACK INFORMATION IS FEEDBACK INFORMATION RESPONSIVE TO THE FIRST MESSAGE, A TIME UNIT IN WHICH THE FIRST TRANSMISSION RESOURCE IS LOCATED IS NOT USED FOR TRANSMITTING DATA BY THE FIRST TERMINAL DEVICE TO AT LEAST ONE THIRD TERMINAL DEVICE, AND THE FIRST TERMINAL DEVICE, THE SECOND TERMINAL DEVICE, AND THE AT LEAST ONE THIRD TERMINAL DEVICE BELONG TO A FIRST GROUP — 520

300

A FIRST TERMINAL DEVICE RECEIVES A FIRST MESSAGE SENT BY A SECOND TERMINAL DEVICE — 310

THE FIRST TERMINAL DEVICE OBTAINS A FIRST TRANSMISSION RESOURCE, WHERE A TIME UNIT IN WHICH THE FIRST TRANSMISSION RESOURCE IS LOCATED IS NOT USED FOR TRANSMITTING DATA BY THE FIRST TERMINAL DEVICE TO AT LEAST ONE THIRD TERMINAL DEVICE, AND THE FIRST TERMINAL DEVICE, THE SECOND TERMINAL DEVICE, AND THE AT LEAST ONE THIRD TERMINAL DEVICE BELONG TO A FIRST GROUP — 320

THE FIRST TERMINAL DEVICE SENDS TO THE SECOND TERMINAL DEVICE FIRST FEEDBACK INFORMATION RESPONSIVE TO THE FIRST MESSAGE, BY USING THE FIRST TRANSMISSION RESOURCE — 330

FIG. 3

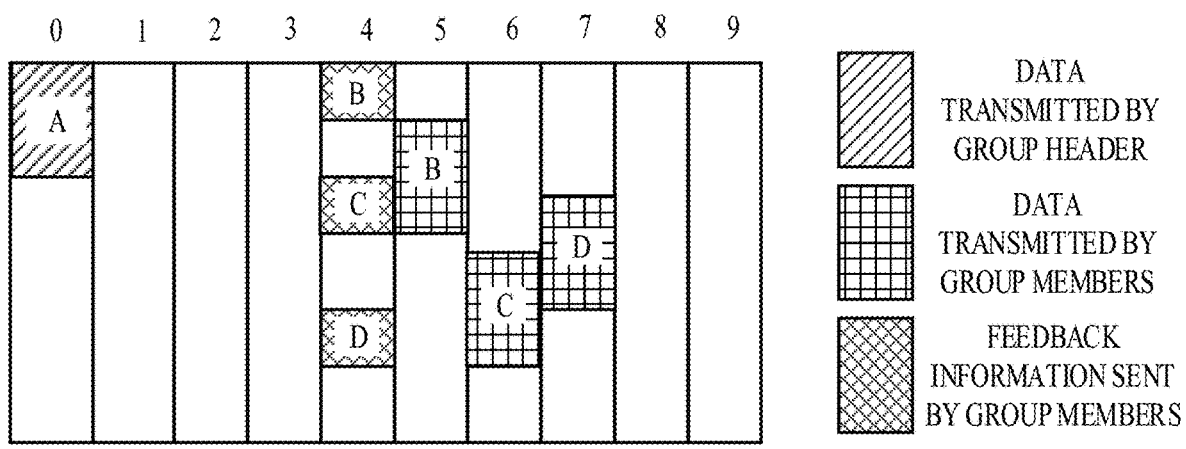

| A SECOND TERMINAL DEVICE SENDS A FIRST MESSAGE TO A FIRST TERMINAL DEVICE | 510 |

| THE SECOND TERMINAL DEVICE RECEIVES FIRST FEEDBACK INFORMATION, WHICH IS SENT BY THE FIRST TERMINAL DEVICE USING A FIRST TRANSMISSION RESOURCE, WHERE THE FIRST FEEDBACK INFORMATION IS FEEDBACK INFORMATION RESPONSIVE TO THE FIRST MESSAGE, A TIME UNIT IN WHICH THE FIRST TRANSMISSION RESOURCE IS LOCATED IS NOT USED FOR TRANSMITTING DATA BY THE FIRST TERMINAL DEVICE TO AT LEAST ONE THIRD TERMINAL DEVICE, AND THE FIRST TERMINAL DEVICE, THE SECOND TERMINAL DEVICE, AND THE AT LEAST ONE THIRD TERMINAL DEVICE BELONG TO A FIRST GROUP | 520 |

| A NETWORK DEVICE ALLOCATES A FIRST TRANSMISSION RESOURCE TO A FIRST TERMINAL DEVICE, WHERE THE FIRST TRANSMISSION RESOURCE IS USED FOR SENDING, BY THE FIRST TERMINAL DEVICE, FIRST FEEDBACK INFORMATION TO A SECOND TERMINAL DEVICE, THE FIRST FEEDBACK INFORMATION IS FEEDBACK INFORMATION RESPONSIVE TO A FIRST MESSAGE SENT BY THE SECOND TERMINAL DEVICE TO THE FIRST TERMINAL DEVICE, A TIME UNIT IN WHICH THE FIRST TRANSMISSION RESOURCE IS LOCATED IS NOT USED FOR TRANSMITTING DATA BY THE FIRST TERMINAL DEVICE TO AT LEAST ONE THIRD TERMINAL DEVICE, AND THE FIRST TERMINAL DEVICE, THE SECOND TERMINAL DEVICE, AND THE AT LEAST ONE THIRD TERMINAL DEVICE BELONG TO A FIRST GROUP | 610 |

FIG. 6

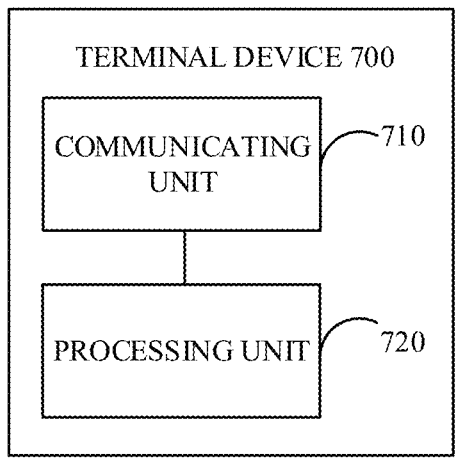

FIG. 7

COMMUNICATION METHODS AND DEVICES FOR SIDELINK

CROSS REFERENCE TO RELATED APPLICATION(S)

This application is a continuation of U.S. application Ser. No. 17/532,738, filed Nov. 22, 2021, which is a continuation of U.S. application Ser. No. 17/201,058, filed on Mar. 15, 2021, which is a continuation of International Application No. PCT/CN2018/106333, filed on Sep. 18, 2018, the entire disclosures of which are incorporated herein by reference.

TECHNICAL FIELD

This disclosure relates to the field of communication, and more particularly to communication methods and devices for a sidelink (SL).

BACKGROUND

An Internet of vehicles (IoV) system adopts a device to device (D2D)-based SL transmission technology. Different from a traditional long term evolution (LTE) system in which communication data are received or sent via a base station, the IoV system adopts a direct terminal-to-terminal communication, and therefore has a higher spectrum efficiency and lower transmission delay.

In a new radio (NR) system, the IoV system can support multiple types of transmission, such as unicast, groupcast, or broadcast.

In groupcast communication, one terminal device serves as a group header, while the rest of the terminal devices are group members. The group header can send a groupcast message to the group members. However, there is currently no technical solution for sending, by the group members, to the group header feedback information in response to the groupcast message.

SUMMARY

In a first aspect, a communication method for an SL is provided. The method includes the following. A first terminal device receives a first message sent by a second terminal device. The first terminal device obtains a first transmission resource, where a time unit in which the first transmission resource is located is not used for transmitting data by the first terminal device to at least one third terminal device or the second terminal device, and the first terminal device, the second terminal device, and the at least one third terminal device belong to a first group. The first terminal device sends first feedback information to the second terminal device, by using the first transmission resource.

In a second aspect, a terminal device is provided. The terminal device includes a transceiver, at least one processor, and a memory storing instructions. The instructions, when executed by the at least one processor, cause the at least one processor to: obtain a first transmission resource, wherein a time unit in which the first transmission resource is located is not used for transmitting data by the terminal device to at least one third terminal device or a second terminal device, and the terminal device, the second terminal device, and the at least one third terminal device belong to a first group. The instructions, when executed by the at least one processor, cause the transceiver to: receive a first message sent by the second terminal device; send to the second terminal device first feedback information in response to the first message, by using the first transmission resource.

BRIEF DESCRIPTION OF THE DRAWINGS

FIG. 3 is a schematic flowchart of a communication method for an SL according to implementations.

FIG. 4 is a schematic diagram illustrating a first transmission resource and a second transmission resource according to implementations.

FIG. 5 is a schematic flowchart of a communication method for an SL according to other implementations.

FIG. 6 is a schematic flowchart of a communication method for an SL according to other implementations.

FIG. 7 is a schematic block diagram of a terminal device according to implementations.

DETAILED DESCRIPTION

Figure 1:
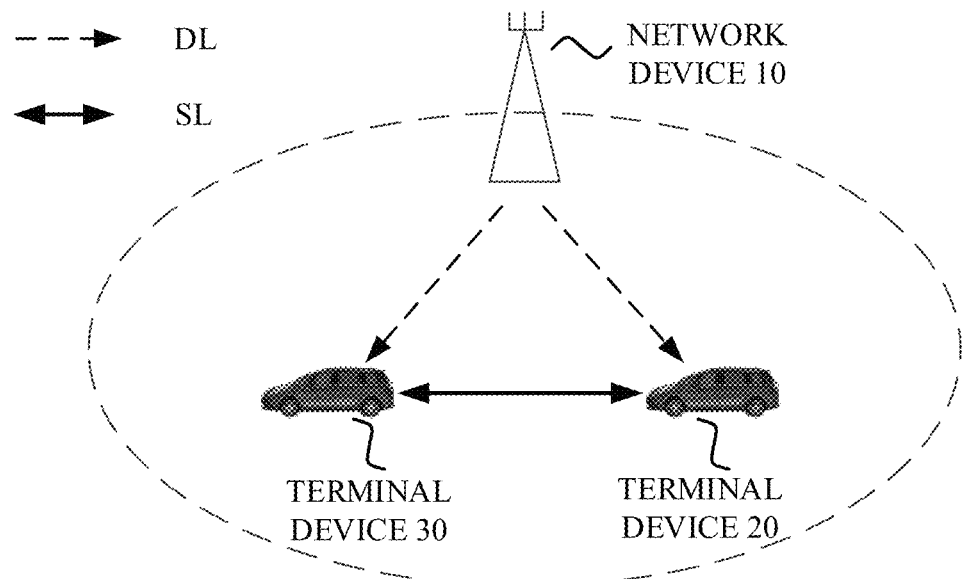
FIG. 1 is a diagram illustrating an application scenario of an SL according to implementations.

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations are applicable to various communication systems, for example, a global system of mobile communication (GSM), a code division multiple access (CDMA) system, a wideband code division multiple access (WCDMA) system, a general packet radio service (GPRS) system, an LTE system, an LTE frequency division duplex (LTE-FDD) system, an LTE time division duplex (LTE-TDD) system, a universal mobile telecommunication system (UMTS), a worldwide interoperability for microwave access (WiMAX) communication system, or a 5th generation (5G) system.

In the disclosure, various implementations are described in connection with a network device. The network device can provide a communication coverage for a specific geographical area and communicate with terminal devices in the coverage area. The network device may be a base transceiver station (BTS) in the GSM or in the CDMA system, or may be a NodeB (NB) in the WCDMA system, or may be an evolutional Node B (eNB or eNodeB) in the LTE system, or may be a gNB in an NR system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

In the disclosure, various implementations are described in connection with a terminal device. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Figure 2:
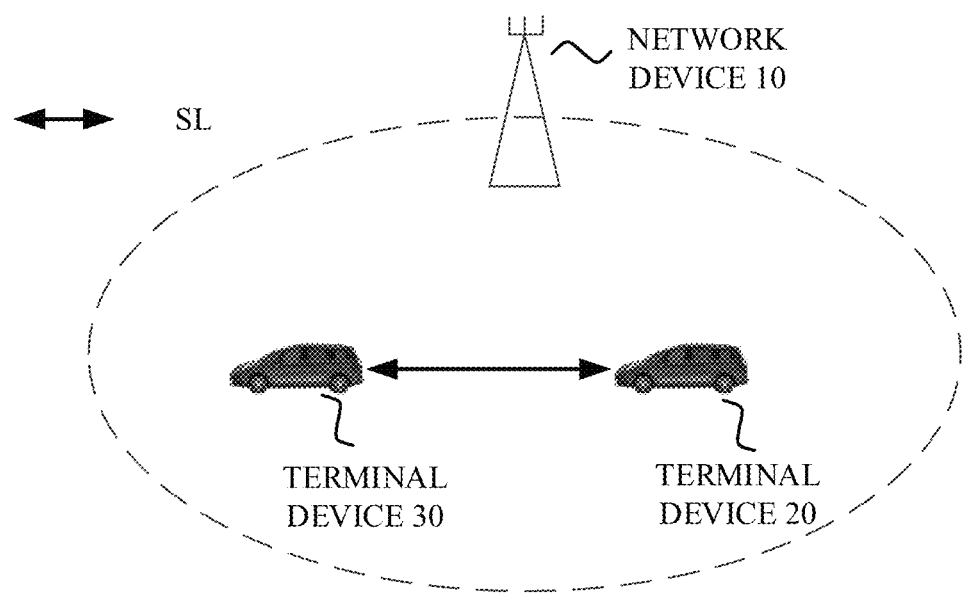
FIG. 2 is a diagram illustrating an application scenario of an SL according to other implementations.

FIG. 1 and FIG. 2 are schematic diagrams illustrating application scenarios of implementations. FIG. 1 exemplarily illustrates one network device and two terminal devices. A communication system may also include multiple network devices, and there can be other numbers of terminal devices in a coverage area of each of the network devices, which is not limited herein.

Terminal device 20 and terminal device 30 can communicate with each other through D2D communication. During D2D communication, terminal device 20 and terminal device 30 directly communicate with each other through a D2D link, that is, an SL, for example, as illustrated in FIG. 1 or FIG. 2. As illustrated in FIG. 1, terminal device 20 and terminal device 30 communicate with each other through an SL, in which transmission resources are allocated by a network device. As illustrated in FIG. 2, terminal device 20 and terminal device 30 communicate with each other through an SL, in which transmission resources are selected by terminal device 20 and terminal device 30 instead of being allocated by the network device.

The application scenario illustrated in FIG. 1 can be applied to a vehicle to vehicle (V2V) scenario. The mode illustrated in FIG. 1 can be referred to as mode 3. Transmission resources of a vehicle user equipment (VUE) are allocated by a base station. The VUE can transmit data on an SL by using a resource allocated by the base station. It should be understood that, the resource allocated by the base station to the terminal device may be a resource used for a single transmission or a resource used for semi-static transmission.

The application scenario illustrated in FIG. 2 can be applied to a V2V scenario. The mode illustrated in FIG. 2 can be referred to as mode 4. The VUE can adopt a "sensing+reservation" transmission mode. The VUE can acquire, through sensing, an available transmission resource set from a resource pool, and then randomly select a resource from the transmission resource set to transmit data. Since a service in an IoV system is periodic, the terminal device usually adopts a semi-static transmission mode, that is, the terminal device can select a transmission resource and continuously use the selected transmission resource in multiple transmission periods, which can reduce probability of resource reselection and probability of resource collision. The terminal device can carry, in control information of the current transmission, information used to determine a resource reserved for a next transmission, such that other terminal devices can determine, by detecting the control information, whether the resource has been reserved or used, thereby reducing probability of resource collision.

D2D communication can be applied to V2V communication or vehicle to everything (V2X) communication, or an enhanced (cellular) V2X (eV2X). In V2X communication, X may generally refer to any device with wireless receiving and transmitting capabilities, for example (but not limited to), a wireless device that moves slowly, a vehicle-mounted device that moves quickly, a network control node with wireless transmitting and receiving capabilities, or the like. It should be understood that implementations herein are mainly applied to a V2X communication scenario, but it can also be applied to any other D2D communication scenario, which is not limited herein.

FIG. 3 is a schematic flowchart of a communication method 300 for an SL according to implementations. The method 300 includes at least some of the following operations.

At block 310, a first terminal device receives a first message sent by a second terminal device.

The first message may be a groupcast message in groupcast communication, or may be other messages such as a unicast message, which is not limited herein. The groupcast message can be comprehended as a message which a group header sends simultaneously to all members in the group in groupcast communication.

It should be understood that, the name of the groupcast message is not limited in implementations, that is, the groupcast message may also be expressed in other names.

According to implementations, the first terminal device may be a group member in groupcast communication. The second terminal device may be a group header or a group member in groupcast communication. Exemplarily, the second terminal device is a group header.

In groupcast communication, the group header may send a unicast message or a groupcast message to the group member(s) in the group. The group member(s), upon receiving the groupcast message, can send to the group header feedback information in response to the groupcast message. The group header, upon receiving the feedback information from the group member(s), can make a proper adjustment (for example, adjust a modulation and coding scheme (MCS)) or determine whether retransmission is required, according to information fed back by multiple group members.

The groupcast message may include status information of the group header or behavior information of the group header, such as information indicating that the group header will take a turn or the group header will speed up or slow down.

The groupcast message may also include information indicating that there are other vehicles which have joined the group or there is a group member(s) which has left the group.

The feedback information which is sent by the group member to the group header may include, but is not limited to, acknowledgment (ACK)/negative acknowledgment (NACK), channel quality indicator (CQI), channel state information (CSI), beam indication information, precoding matrix indication information, rank information, or power information.

As an example, when the group header will brake, the group header can send to the group members a groupcast message indicating that the group header will brake. If the group member has received such a groupcast message, the group member can send to the group header ACK information indicating that the group member has received the groupcast message. If the group member has not received the groupcast message successfully, the group member can send to the group header NACK information indicating that the group member has not received the groupcast message.

If the group header receives the NACK information fed back by the group member, the group header can resend the groupcast message. In this scenario, the group header can resend the message through groupcast to all the group members, or resend the message through unicast to only the group member(s) that has not received the groupcast message.

As another example, the group header can send to the group member a measurement reference signal (MRS). The group member, upon receiving the MRS, can send to the group header CQI or CSI, to feed back to the group header a channel state between the group member and the group header.

As another example, the group header can send the groupcast message to the group member at a certain power. The group member, upon receiving the groupcast message, compares the received power with a threshold power to obtain an adjustment value, and feeds back the adjustment value to the group header.

At block 320, the first terminal device obtains a first transmission resource.

The first transmission resource can be used for sending, by the first terminal device, to the second terminal device first feedback information in response to the first message.

The first transmission resource may be in at least one time unit.

The time unit may be a subframe, a slot, a time-domain symbol, or a short transmission timing interval (sTTI).

For example, the first terminal device can send the first feedback information to the second terminal device in subframe 3 and subframe 4. In this scenario, the first transmission resource spans two time units.

For another example, the first terminal device can send the first feedback information to the second terminal device in subframe 3. In this scenario, the first transmission resource is in one time unit.

According to implementations, a time unit(s) of the first transmission resource may be used for transmitting data, by the first terminal device, to the second terminal device, or may not be used for transmitting data, by the first terminal device, to the second terminal device, which is not limited herein.

In other words, the first terminal device can send the first feedback information to the second terminal device and transmit data to the second terminal device in the same time unit, or send the first feedback information to the second terminal device and transmit data to the second terminal device respectively in different time units.

For example, the first terminal device can both send the first feedback information to the second terminal device and transmit data to the second terminal device in subframe 5.

For another example, the first terminal device can send the first feedback information to the second terminal device in subframe 5 and transmit data to the second terminal device in subframe 6.

The feedback information and the data referred to herein have different meanings. The feedback information has been elaborated in the foregoing description and will not be repeated herein. The data may be, for example, state information of the group member, such as speed of the group member at the current time point, location of the group member at the current time point, or direction of the group member at the current time point.

In some implementations, the time unit in which the first transmission resource is located is not used for transmitting data by the first terminal device to at least one third terminal device, where the first terminal device, the second terminal device, and the at least one third terminal device belong to the same group, for example, a first group.

The at least one third terminal device may be at least one terminal device in the first group other than the first terminal device and the second terminal device.

In some implementations, the at least one third terminal device is at least one terminal device in the first group, which is configured to send second feedback information to the second terminal device in the time unit in which the first transmission resource is located. In other words, the first terminal device and the at least one third terminal device send feedback information to the second terminal device in the same time unit.

As such, the at least one third terminal device does not have to send feedback information and receive data at the same time point, which is possible to avoid half duplexity.

The first terminal device, the second terminal device, and the at least one third terminal device may be in a cell, or may be out of a cell, and the disclosure is not limited in this regard.

It should be understood that, when the first terminal device, the second terminal device, and the at least one third terminal device are in a cell, a network device or the second terminal device can allocate to terminal devices in the first group transmission resources used for sending feedback information. When the first terminal device, the second terminal device, and the at least one third terminal device are out of a cell, the second terminal device allocates to terminal devices in the first group transmission resources used for sending feedback information.

For the convenience of understanding, in implementations herein, a resource used for transmitting data by the first terminal device to the at least one third terminal device is referred to as a second transmission resource, that is, the second transmission resource is used for transmitting data by the first terminal device to the at least one third terminal device.

A time unit in which the second transmission resource is located is different from the time unit in which the first transmission resource is located.

As an example, the phrase "the time unit in which the second transmission resource is located is different from the time unit in which the first transmission resource is located" can mean that the time unit in which the second transmission resource is located does not overlap with the time unit in which the first transmission resource is located.

For example, the first transmission resource occupies subframe 1, and the second transmission resource occupies subframe 2, that is, the time unit in which the first transmission resource is located is different from the time unit in which the second transmission resource is located.

For another example, the first transmission resource occupies three time-domain symbols, namely time-domain symbol 1, time-domain symbol 2, and time-domain symbol 3. Accordingly, the second transmission resource cannot occupy any one of time-domain symbol 1, time-domain symbol 2, and time-domain symbol 3. For example, the second transmission resource can occupy time-domain symbol 4 and time-domain symbol 5. In this case, the time unit in which the first transmission resource is located can be considered to be different from the time unit in which the second transmission resource is located.

As an example, the phrase "the time unit in which the first transmission resource is located is not used for transmitting data by the first terminal device to the at least one third terminal device" can mean that the time unit in which the first transmission resource is located may not be used for transmitting groupcast data by the first terminal device to multiple third terminal devices and the second terminal device. In other words, the time unit in which the first transmission resource is located may not be used for transmitting groupcast data by the first terminal device to all terminal devices in the first group other than the first terminal device.

For example, the first group includes four members, namely group member A, group member B, group member C, and group member D, where group member B is the first terminal device. The time unit in which the first transmission resource is located is subframe 4, and accordingly group member B can send groupcast data to group member A, group member C, and group member D in other subframes other than subframe 4, such as subframe 5.

In this scenario, the time unit in which the first transmission resource is located can be used for transmitting unicast data by the first terminal device to the second terminal device or one third terminal device, where the one third terminal device has not sent the second feedback information to the second terminal device in the time unit in which the first transmission resource is located.

As another example, the phrase "the time unit in which the first transmission resource is located is not used for transmitting data by the first terminal device to the at least one third terminal device" can mean that the time unit in which the first transmission resource is located is not used for transmitting unicast data by the first terminal device to one third terminal device.

In this scenario, the one third terminal device may be any one terminal device in the first group and configured to send the second feedback information to the second terminal device in the time unit in which the first transmission resource is located.

For example, the first group includes four members, namely group member A, group member B, group member C, and group member D, where group member B is the first terminal device, and group member A is the second terminal device. The time unit in which the first transmission resource is located is subframe 4. Group member C also sends feedback information to group member A in subframe 4. Group member D sends feedback information to group member A in subframe 6. Since group member C sends feedback information to group member A in subframe 4, group member C cannot receive unicast data from group member B in subframe 4, and therefore group member B cannot send unicast data to group member C in subframe 4. Group member B can send unicast data to group member C in subframe 5. In this case, group member C is the third terminal device. Since group member D does not send feedback information to group member A in subframe 4, group member B can send unicast data to group member D in subframe 4.

In some implementations, the time unit in which the first transmission resource is located is not used for transmitting data by at least one fourth terminal device, where the at least one fourth terminal device is a terminal device in the first group other than the first terminal device. In other words, the time unit in which the first transmission resource is located may not be used for transmitting data.

In some implementations, the time unit in which the first transmission resource is located is used for sending, by the at least one fourth terminal device, third feedback information to the second terminal device. In other words, terminal devices in the first group can send feedback information to the second terminal device in the same time unit. If a terminal device in the first group, such as a fifth terminal device, also belongs to a second group, the fifth terminal device can transmit data to terminal devices in the second group in the time unit in which the first transmission resource is located, where the second group may include at least one group.

If the second group includes no terminal device, which also belongs to the first group, other than the fifth terminal device, the fifth terminal device can transmit groupcast data to all terminal devices in the second group in the time unit in which the first transmission resource is located.

Alternatively, if the second group includes other terminal devices, which also belong to the first group, other than the fifth terminal device, the fifth terminal device can transmit unicast data to terminal devices in the second group other than terminal devices which also belong to the first group, in the time unit in which the first transmission resource is located.

For example, the first group includes group member A, group member B, and group member C, and the second group includes group member B, group member E, and group member F. Group member A sends feedback information in subframe 3, that is, the time unit in which the first transmission resource is located is subframe 3. Since in the second group, only group member B also belongs to the first group, group member B can transmit groupcast data to group member E and group member F in the second group in subframe 3.

For another example, the first group includes group member A, group member B, and group member C, and the second group includes group member B, group member C, group member E, and group member F, where group member A is a group header in the first group, and group member F is a group header in the second group. Group member C in the first group sends feedback information to group header A in subframe 3, that is, the time unit in which the first transmission resource is located is subframe 3. Since in the second group, group member B and group member C also belong to the first group, group member B can transmit unicast data respectively to group member E and group member F in the second group in subframe 3, but cannot transmit data to group member C in subframe 3.

It should be understood that, in implementations herein, the terms "first", "second", "third", and so on are intended to distinguish between different objects, but do not constitute limitation on the scope of the disclosure.

The following will describe the method provided herein in further detail with examples in connection with FIG. 4. Time units illustrated in FIG. 4 are subframes, which include ten subframes in total, namely subframe 0, subframe 1, . . . , and subframe 9. The group illustrated in FIG. 4 includes four members, where group member B is the first terminal device, group header A is the second terminal device, and group member C and group member D are the third terminal devices. Group header A sends a groupcast message in subframe 0. Group member B, group member C, and group member D receive the groupcast message and send feedback information to group header A. Group member B, after obtaining the first transmission resource (the uppermost subband of subframe 4), sends feedback information to group header A on the first transmission resource, and group member C and group member D also send feedback information to group header A in the time unit in which the first transmission resource is located (subframe 4).

Since group member C and group member D also send feedback information to group header A in the time unit in which the first transmission resource is located (subframe 4), a time unit in which group member B transmits data to group member C and group member D is different from the time unit in which the first transmission resource is located. As illustrated in FIG. 4, group member B transmits data to group member C and group member D in subframe 5. Group member C transmits data on subframe 6, and group member D transmits data in subframe 7.

In some implementations, the first terminal device obtains the first transmission resource as follows. The second terminal device sends to the first terminal device first indication information, where the first indication information is used to determine the first transmission resource. The first terminal device, upon receiving the first indication information, can determine the first transmission resource.

In some implementations, the first indication information can be carried in a physical sidelink control channel (PSCCH) or a physical sidelink shared channel (PSSCH).

The second terminal device can send the first indication information to the first terminal device while transmitting groupcast data to group members. For example, the second terminal device can transmit groupcast data to group members in subframe n and send the first indication information to the first terminal device in subframe n.

Alternatively, the second terminal device can send the first indication information to the first terminal device after transmitting groupcast data to group members. For example, the second terminal device can transmit groupcast data to group members in subframe n and send the first indication information to the first terminal device in subframe n+1.

As an example, the second terminal device can explicitly indicate the first transmission resource to the first terminal device through the first indication information. For example, the first indication information can indicate that the first transmission resource is the uppermost subband of subframe 5.

As another example, the second terminal device can implicitly indicate the first transmission resource to the first terminal device through the first indication information.

For example, the first indication information can be used to determine the first transmission resource set. The first terminal device, after obtaining the first transmission resource set, determines the first transmission resource from the first transmission resource set.

For each transmission resource in the first transmission resource set, the time unit of the transmission resource may be the same or different, and the disclosure is not limited in this regard.

Transmission resources in the first transmission resource set may be in m time unit(s), where m is a minimum positive integer which satisfies formula m×L≥K−1. L represents the number of available first transmission resources in each time unit, and K represents the number of terminal devices in the first group, where L and K are positive integers.

As an example, when m>1, the m time units are consecutive.

For example, if K=7 and L=4, m=2. In this case, the first transmission resource set occupies two consecutive time units. The number of resources which can be used for sending feedback information in the two time units is 2L=8. The 8 resources constitute the first transmission resource set. The first terminal device can select the first transmission resource from the 8 resources.

For another example, if K=3 and L=5, m=1. In this case, all the resources in the first transmission resource set are in one time unit.

As an example, the first indication information can indicate that m consecutive time units, which start from a $k^{th}$ time unit subsequent to the time unit in which the first terminal device receives the groupcast message, are time units of the first transmission resource set. In other words, the first terminal device receives the groupcast message in an $n^{th}$ time unit, and an $(n+k)^{th}$ time unit to an $(n+k+m-1)$th time unit are the time units of the first transmission resource set, where n and k are integers greater than or equal to 1.

For example, n=4, k=2, and m=2. Accordingly, the first terminal device receives the groupcast message in subframe 4, and the time units of the first transmission resource set are subframe 6 and subframe 7.

The first terminal device can determine the first transmission resource from the first transmission resource set in various manners, which will be hereinafter described in detail.

Manner 1: The first terminal device randomly selects the first transmission resource from the first transmission resource set.

Manner 2: The first terminal device determines the first transmission resource from the first transmission resource set according to an index of the first transmission resource.

For example, the index of the first transmission resource is 3, and accordingly, the first terminal device can determine a transmission resource, of which the index is 3, in the first transmission resource set as the first transmission resource.

In some implementations, the first terminal device receives index information sent by a network device or the second terminal device, where the index information is used to determine the index of the first transmission resource.

As an example, the index of the first transmission resource can be set in advance in the first terminal device.

Manner 3: The first terminal device determines the first transmission resource from the first transmission resource set according to identifier information of the first terminal device.

In some implementations, the identifier information of the first terminal device may include, but is not limited to, a cell radio network temporary identifier (C-RNTI) of the first terminal device, an international mobile subscriber identification number (IMSI) of the first terminal device, and a member identifier of the first terminal device in the first group. The member identifier of the first terminal device in the first group may be the serial number of the first terminal device in the first group. For example, the first group includes ten terminal devices in total, that is, the first group includes ten group members, the serial number of the first terminal device in the first group is 4.

As an example, the identifier information of the first terminal device in the first group may be pre-configured in the first terminal device. The identifier information of the first terminal device in the first group may be pre-configured by the second terminal device or by the network device, which is not limited herein.

Alternatively, the member identifier of the first terminal device in the first group may be sent to the first terminal device by the second terminal device or by the network device.

As an example, the first terminal device can determine the first transmission resource from the first transmission resource set, according to the identifier information of the first terminal device and a mapping relationship between identifier information of a terminal device and the first transmission resource.

The mapping relationship between identifier information of a terminal device and the first transmission resource may be set in advance, or may be determined according to signaling. The second terminal device can send mapping information to the first terminal device. The first terminal device, upon receiving the mapping information, can determine the mapping relationship according to the mapping information.

In other implementations, the first terminal device can determine the first transmission resource N_k according to formula (1):

$$N\_k = \mod(ID, N) \qquad (1)$$

ID represents the identifier information of the first terminal device. N represents a total number of transmission resources in the first transmission resource set, where N can be pre-configured in the first terminal device or sent by the second terminal device or the network device. mod( ) represents a modulo operation.

For example, resources that can be used for sending feedback information in subframe n+4 constitute the first transmission resource set. As an example, ten transmission resources that can be used for sending feedback information are included in subframe n+4 (for instance, one piece of feedback information occupies one subband, and subframe n+4 includes ten subbands), and the ten transmission resources are numbered [0,9], that is, N=10. The first group includes six members which are numbered [0,5], where 0 represents the group header, and group members are numbered [1,5]. The first terminal device is numbered 4, that is, ID=4. Accordingly, the first terminal device can determine the first transmission resource according to formula (1) as follows: N_k=mod(ID,N)=mod(4,10)=4, that is, the first terminal device can determine a subband numbered 4 in subframe n+4 as the first transmission resource.

In this case, terminal devices in the first group can send feedback information to the second terminal device in the same subframe.

It should be understood that, the examples described herein are intended for those skilled in the art to better understand implementations instead of limiting the scope of the disclosure.

In other implementations, the first terminal device obtains the first transmission resource as follows. The first terminal device receives second indication information sent by the network device, where the second indication information is used to determine the first transmission resource set.

In some implementations, the second indication information is carried in downlink control information (DCI) or radio resource control (RRC) signaling.

As an example, the network device can send configuration information to the second terminal device through unicast, where the configuration information is used to determine the first transmission resource set. The second terminal device, upon receiving the configuration information, can allocate to each terminal device in the group transmission resources used for sending feedback information. Then the second terminal device can send the first indication information to the first terminal device through unicast. The first terminal device, upon receiving the first indication information, can determine the first transmission resource.

The configuration information may be carried in DCI or RRC.

The transmission resources used for sending feedback information, which are allocated by the second terminal device to each terminal device in the group, may be in the same time unit but in different frequency domain resources.

As such, terminal devices in the group can send feedback information in the same time unit, which occupies the fewest time domain resources, thereby reducing resource consumption.

Alternatively, the second terminal device, upon receiving the configuration information, obtains the first transmission resource set and sends the obtained first transmission resource set to group members through groupcast. The first terminal device, upon receiving the first transmission resource set, determines the first transmission resource from the first transmission resource set.

As another example, the network device can directly send the second indication information to the first terminal device.

The second indication information may explicitly indicate the first transmission resource.

Alternatively, the second indication information may implicitly indicate the first transmission resource. For example, the second indication information may indicate the first transmission resource set. The first terminal device, after obtaining the first transmission resource set, can determine the first transmission resource from the first transmission resource set.

It should be understood that, the manner in which the first terminal device determines the first transmission resource from the first transmission resource set has been elaborated in the foregoing description and thus will not be described in detail herein again for the sake of simplicity.

In other implementations, the first terminal device obtains the first transmission resource as follows. The first terminal device determines the first transmission resource according to pre-configuration information.

The pre-configuration information may be pre-configured in the first terminal device according to a protocol, where the protocol may directly pre-configure the first transmission resource, or pre-configure the first transmission resource set, for example, pre-configure the time unit(s) of the first transmission resource.

The pre-configuration information may explicitly indicate the first transmission resource. For example, the pre-configuration information may indicate that the first transmission resource is the uppermost subband of subframe 5.

Alternatively, the pre-configuration information may implicitly indicate the first transmission resource. When the pre-configuration information implicitly indicates the first transmission resource, the pre-configuration information may be used to determine the first transmission resource set.

In some implementations, the method further includes the following. The first terminal device obtains a second transmission resource. The first terminal device transmits data to the at least one third terminal device in the first group, by using the second transmission resource.

Data transmitted by the first terminal device to the at least one third terminal device by using the second transmission resource may be groupcast data or unicast data, which is not limited herein.

It should be understood that, for details of the manner in which the first terminal device obtains the second transmission resource, reference can be made to the manner in which the first terminal device obtains the first transmission resource, which will not be elaborated herein for the sake of simplicity.

At block 330, the first terminal device sends first feedback information to the second terminal device, by using the first transmission resource.

In implementations herein, the first terminal device sends feedback information to the second terminal device by using first transmission resource, which is merely an example and does not constitute limitation on the scope of the disclosure. The first terminal device may also send a second message to the second terminal device by using the first transmission resource.

When the first terminal device sends the second message to the second terminal device by using the first transmission resource, the content of the second message is not specifically limited in implementations. For example, the second message may include an expected power of the first terminal device. For another example, when the first terminal device is about to leave the first group, the first terminal device can send the second message to the second terminal device, to inform the second terminal device that the first terminal device will leave the first group.

According to implementations, in groupcast communication, the group member can send feedback information, by using a transmission resource which is in a different time unit from a transmission resource used for transmitting data to other group members in the group, so as to send feedback information.

FIG. 5 is a schematic flowchart of a communication method 500 for an SL according to other implementations. The method 500 includes at least some of the following operations.

At block 510, a second terminal device sends a first message to a first terminal device.

At block 520, the second terminal device receives first feedback information, which is sent by the first terminal device using a first transmission resource.

The first feedback information is feedback information in response to the first message. A time unit in which the first transmission resource is located is not used for transmitting data by the first terminal device to at least one third terminal device. The first terminal device, the second terminal device, and the at least one third terminal device belong to a first group.

In some implementations, the at least one third terminal device is at least one terminal device in the first group, which is configured to send second feedback information to the second terminal device in the time unit in which the first transmission resource is located.

In some implementations, the time unit in which the first transmission resource is located is not used for transmitting data by at least one fourth terminal device. The at least one fourth terminal device is a terminal device in the first group other than the first terminal device.

In some implementations, the method further includes the following. The second terminal device receives third feedback information sent by the at least one fourth terminal device in the time unit in which the first transmission resource is located.

In some implementations, the method further includes the following. The second terminal device sends index information to the first terminal device, where the index information is used to determine an index of the first transmission resource.

In some implementations, the method further includes the following. The second terminal device sends first indication information to the first terminal device, where the first indication information is used to determine the first transmission resource.

In some implementations, the second terminal device sends the first indication information to the first terminal device as follows. The second terminal device receives configuration information sent by a network device, where the configuration information includes a first transmission resource set, and the first transmission resource set includes the first transmission resource. The second terminal device determines the first transmission resource from the first transmission resource set. The second terminal device sends the first indication information to the first terminal device.

In some implementations, the configuration information is carried in DCI or RRC signaling.

In some implementations, the first indication information is carried in a PSCCH or a PSSCH.

In some implementations, the method further includes the following. The second terminal device receives data transmitted by the first terminal device in the time unit in which the first transmission resource is located.

FIG. 6 is a schematic flowchart of a communication method 600 for an SL according to other implementations. The method 600 includes at least some of the following operations.

At block 610, a network device allocates a first transmission resource to a first terminal device.

The first transmission resource is used for sending, by the first terminal device, first feedback information to a second terminal device. The first feedback information is feedback information in response to a first message sent by the second terminal device to the first terminal device. A time unit in which the first transmission resource is located is not used for transmitting data by the first terminal device to at least one third terminal device. The first terminal device, the second terminal device, and the at least one third terminal device belong to a first group.

In some implementations, the at least one third terminal device is at least one terminal device in the first group, which is configured to send second feedback information to the second terminal device in the time unit in which the first transmission resource is located.

In some implementations, the time unit in which the first transmission resource is located is not used for transmitting data by at least one fourth terminal device. The at least one fourth terminal device is a terminal device in the first group other than the first terminal device.

In some implementations, the time unit in which the first transmission resource is located is used for sending, by the at least one fourth terminal device, third feedback information to the second terminal device.

In some implementations, the network device allocates the first transmission resource to the first terminal device as follows. The network device sends indication information to the first terminal device, where the indication information is used to determine the first transmission resource.

In some implementations, the indication information is carried in DCI or RRC signaling.

In some implementations, the method further includes the following. The network device sends configuration information to the second terminal device, where the configuration information includes a first transmission resource set, and the first transmission resource set includes the first transmission resource.

In some examples, the configuration information is carried in DCI or RRC signaling.

In some implementations, the method further includes the following. The network device sends index information to the first terminal device, where the index information is used to determine an index of the first transmission resource.

It should be understood that, although the method 300, the method 500, and the method 600 are separately described above, it does not mean that the method 300, the method 500, and the method 600 are independent of each other. The description of each of the foregoing methods may be referred to each other. The technical solutions of the foregoing methods may be combined without conflict. For example, description of the method 300 may be applied to the method 500 and the method 600.

It should be understood that, in various implementations herein, the size of the sequence number of each process described above does not mean the order of execution, and the execution order of each process should be determined by its function and internal logic, which shall not constitute any limitation on the implementation process of implementations.

The communication method of implementations has been described in detail above. The following will describe communication devices of implementations with reference to FIG. 7 to FIG. 9. Technical features described in the foregoing method implementations can be applied to device/apparatus implementations below.

FIG. 7 is a schematic block diagram of a terminal device 700 according to implementations. As illustrated in FIG. 7, the terminal device 700 includes a communicating unit 710 and a processing unit 720. The communicating unit 710 is configured to receive a first message sent by a second terminal device. The processing unit 720 is configured to obtain a first transmission resource, where a time unit in which the first transmission resource is located is not used for transmitting data by the terminal device to at least one third terminal device, and the terminal device 700, the second terminal device, and the at least one third terminal device belong to a first group. The communicating unit 710 is further configured to send to the second terminal device first feedback information in response to the first message, by using the first transmission resource.

In some implementations, the at least one third terminal device is at least one terminal device in the first group, which is configured to send second feedback information to the second terminal device in the time unit in which the first transmission resource is located.

In some implementations, the time unit in which the first transmission resource is located is not used for transmitting data by at least one fourth terminal device. The at least one fourth terminal device is a terminal device in the first group other than the terminal device 700.

In some implementations, the time unit in which the first transmission resource is located is used for sending, by the at least one fourth terminal device, third feedback information to the second terminal device.

In some implementations, the processing unit 720 is configured to determine the first transmission resource from a first transmission resource set.

In some implementations, the processing unit 720 is configured to determine the first transmission resource from the first transmission resource set according to identifier information of the terminal device 700.

In some implementations, the identifier information includes a C-RNTI of the terminal device 700 or a member identifier of the terminal device 700 in the first group.

In some implementations, the first transmission resource N_k satisfies the following formula:

$$N\_k = \mathrm{mod}(ID, N) \qquad (1)$$

ID represents the identifier information of the terminal device 700. N represents a total number of transmission resources in the first transmission resource set. mod( ) represents a modulo operation.

In some implementations, the processing unit 720 is configured to determine the first transmission resource from the first transmission resource set according to an index of the first transmission resource.

In some implementations, the communicating unit 710 is further configured to receive index information sent by a network device or the second terminal device, where the index information is used to determine the index of the first transmission resource.

In some implementations, the communicating unit 710 is further configured to receive first indication information sent by the second terminal device, where the first indication information is used to determine the first transmission resource.

In some implementations, the first indication information is carried in a PSCCH or a PSSCH.

In some implementations, the communicating unit 710 is further configured to receive second indication information sent by the network device, where the second indication information is used to determine the first transmission resource set.

In some implementations, the second indication information is carried in DCI or RRC signaling.

In some implementations, the processing unit 720 is configured to determine the first transmission resource according to pre-configuration information.

In some implementations, the processing unit 720 is further configured to obtain a second transmission resource, where a time unit in which the second transmission resource is located is different from the time unit in which the first transmission resource is located, and the second transmission resource is used for transmitting data by the terminal device 700 to the at least one third terminal device in the first group. The communicating unit 710 is further configured to transmit data to the at least one third terminal device in the first group, by using the second transmission resource.

It should be understood that, the terminal device 700 may correspond to the first terminal device in the method 300 and can implement operations performed by the first terminal device in the method 300, which will not be repeated herein for the sake of simplicity.

Figure 8:
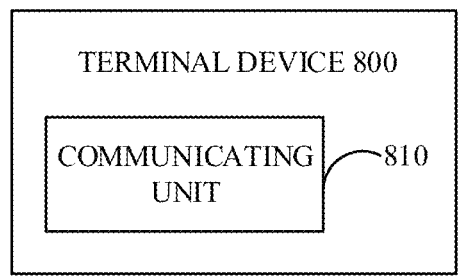
FIG. 8 is a schematic block diagram of a terminal device according to other implementations.

FIG. 8 is a schematic block diagram of a terminal device 800 according to other implementations. As illustrated in FIG. 8, the terminal device 800 includes a communicating unit 810. The communicating unit 810 is configured to send a first message to a first terminal device, and receive first feedback information, which is sent by the first terminal device using a first transmission resource, where the first feedback information is feedback information in response to the first message, a time unit in which the first transmission resource is located is not used for transmitting data by the first terminal device to at least one third terminal device, and the first terminal device, the terminal device 800, and the at least one third terminal device belong to a first group.

In some implementations, the at least one third terminal device is at least one terminal device in the first group, which is configured to send second feedback information to the terminal device 800 in the time unit in which the first transmission resource is located.

In some implementations, the time unit in which the first transmission resource is located is not used for transmitting data by at least one fourth terminal device. The at least one fourth terminal device is a terminal device in the first group other than the first terminal device.

In some implementations, the communicating unit 810 is further configured to receive third feedback information sent by the at least one fourth terminal device in the time unit in which the first transmission resource is located.

In some implementations, the communicating unit 810 is further configured to send index information to the first terminal device, where the index information is used to determine an index of the first transmission resource.

In some implementations, the communicating unit 810 is further configured to send first indication information to the first terminal device, wherein the first indication information is used to determine the first transmission resource.

In some implementations, the communicating unit 810 is configured to receive configuration information sent by a network device, where the configuration information includes a first transmission resource set, and the first transmission resource set includes the first transmission resource. The terminal device 800 further includes a processing unit 820. The processing unit 820 is configured to determine the first transmission resource from the first transmission resource set. The communicating unit 810 is configured to send the first indication information to the first terminal device.

In some implementations, the configuration information is carried in DCI or RRC signaling.

In some implementations, the first indication information is carried in a PSCCH or a PSSCH.

In some implementations, the communicating unit 810 is further configured to receive data transmitted by the first terminal device in the time unit in which the first transmission resource is located.

It should be understood that, the terminal device 800 may correspond to the second terminal device in the method 500 and can implement operations performed by the second terminal device in the method 500, which will not be repeated herein for the sake of simplicity.

Figure 9:
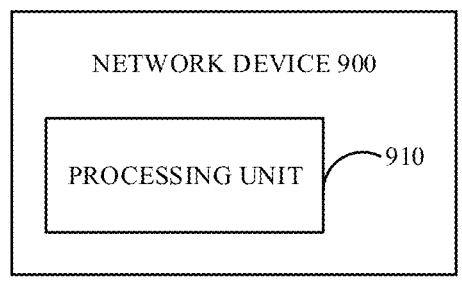
FIG. 9 is a schematic block diagram of a network device according to implementations.

FIG. 9 is a schematic block diagram of a network device 900 according to implementations. As illustrated in FIG. 9, the network device 900 includes a processing unit 910. The processing unit 910 configured to allocate a first transmission resource to a first terminal device, where the first transmission resource is used for sending, by the first terminal device, first feedback information to a second terminal device, the first feedback information is feedback information in response to a first message sent by the second terminal device to the first terminal device, a time unit in which the first transmission resource is located is not used for transmitting data by the first terminal device to at least one third terminal device, and the first terminal device, the second terminal device, and the at least one third terminal device belong to a first group.

In some implementations, the at least one third terminal device is at least one terminal device in the first group, which is configured to send second feedback information to the second terminal device in the time unit in which the first transmission resource is located.

In some implementations, the time unit in which the first transmission resource is located is not used for transmitting data by at least one fourth terminal device. The at least one fourth terminal device is a terminal device in the first group other than the first terminal device.

In some implementations, the time unit in which the first transmission resource is located is used for sending, by the at least one fourth terminal device, third feedback information to the second terminal device.

In some implementations, the network device 900 further includes a communicating unit 920. The communicating unit 920 is configured to send indication information to the first terminal device, where the indication information is used to determine the first transmission resource.

In some implementations, the indication information is carried in DCI or RRC signaling.

In some implementations, the network device 900 further includes a communicating unit 920. The communicating unit 920 is configured to send configuration information to the second terminal device, where the configuration information includes a first transmission resource set, and the first transmission resource set includes the first transmission resource. In some examples, the configuration information is carried in DCI or RRC signaling.

In some implementations, the network device 900 further includes a communicating unit 920. The communicating unit 920 is configured to send index information to the first terminal device, where the index information is used to determine an index of the first transmission resource.

It should be understood that, the network device 900 may correspond to the network device in the method 600 and can implement operations performed by the network device in the method 600, which will not be repeated herein for the sake of simplicity.

Figure 10:
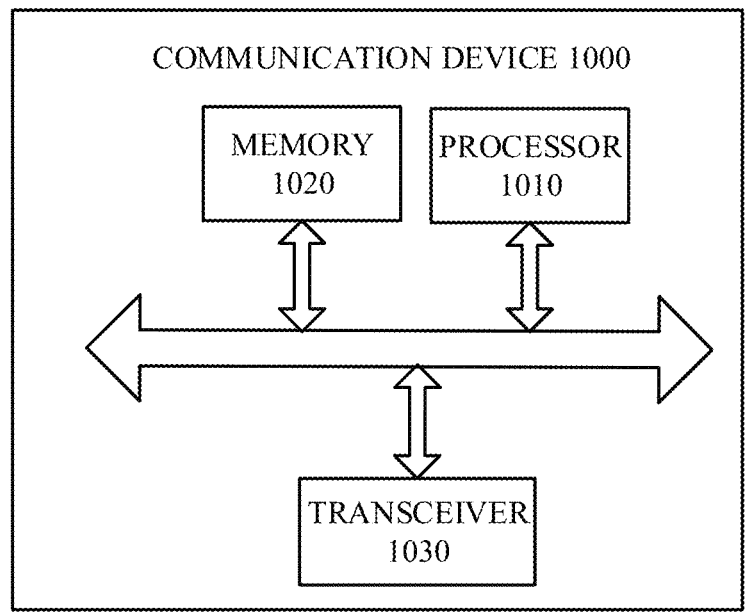
FIG. 10 is a schematic block diagram of a communication device according to implementations.

FIG. 10 is a schematic block diagram of a communication device 1000 according to implementations. As illustrated in FIG. 10, the communication device 1000 includes a processor 1010. The processor 1010 can invoke and execute computer programs stored in a memory to perform the method provided in implementations.

As illustrated in FIG. 10, the communication device 1000 can further include the memory 1020. The processor 1010 can invoke and execute the computer programs stored in the memory 1020 to perform the method provided in implementations.

The memory 1020 may be a separate device independent of the processor 1010, or may be integrated into the processor 1010.

As illustrated in FIG. 10, the communication device 1000 can further include a transceiver 1030. The processor 1010 can control the transceiver 1030 to communicate with other devices, for example, to send information or data to other devices, or to receive information or data from other devices.

The transceiver 1030 may include a transmitter and a receiver. The transceiver 1030 may further include an antenna, where one or more antenna can be provided.

The communication device 1000 may be the terminal device of implementations, and the communication device 1000 can implement the operations performed by the first terminal device or the second terminal device described in the foregoing method implementations, which will not be repeated herein for the sake of simplicity.

Alternatively, the communication device 1000 may be the network device of implementations, and the communication device 1000 can implement the operations performed by the network device described in the foregoing method implementations, which will not be repeated herein for the sake of simplicity.

Figure 11:
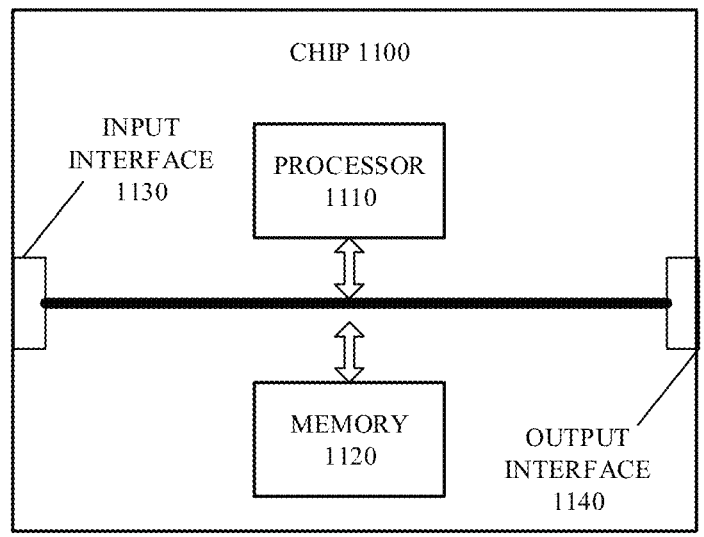
FIG. 11 is a schematic block diagram of a chip according to implementations.

FIG. 11 is a schematic structural diagram of a chip according to implementations. As illustrated in FIG. 11, the chip 1100 includes a processor 1110. The processor 1110 is configured to invoke and execute computer programs stored in a memory to perform the method provided in implementations.

As illustrated in FIG. 11, the chip 1100 further includes the memory 1120. The processor 1110 can invoke and execute the computer programs stored in the memory 1120 to perform the method provided in implementations.

The memory 1120 may be a separate device independent of the processor 1110, or may be integrated into the processor 1110.

The chip 1100 may further include an input interface 1130. The processor 1110 can control the input interface 1130 to communicate with other devices or chips, for example, to acquire information or data sent by other devices or chips.

The chip 1100 may further include an output interface 1140. The processor 1110 can control the output interface 1140 to communicate with other devices or chips, for example, to output information or data to other devices or chips.

The chip is applicable to the terminal device of implementations, and the chip can implement the operations performed by the first terminal device or the second terminal device described in the foregoing method implementations, which will not be repeated herein for the sake of simplicity.

Alternatively, the chip is applicable to the network device of implementations, and the chip can implement the operations performed by the network device described in the foregoing method implementations, which will not be repeated herein for the sake of simplicity.

It should be understood that, the chip herein may also be referred to as a system-on-chip (SOC).

The processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDR SDRAM), an enhanced SDRAM (ESDRAM), a synchronous link dynamic random access memory (synch-link DRAM, SLDRAM), and a direct rambus random access memory (direct rambus RAM, DRRAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc.

In other words, the memory of implementations is intended to include, but is not limited to, these and any other suitable types of memory.

Figure 12:
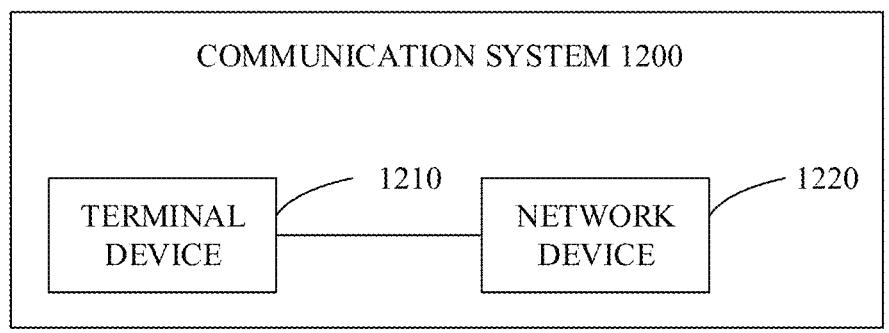
FIG. 12 is a schematic block diagram of a communication system according to implementations.

FIG. 12 is a schematic block diagram of a communication system 1200 according to implementations. As illustrated in FIG. 12, the communication system 1200 includes a terminal device 1210 and a network device 1220.

The terminal device 1210 can implement functions of the first terminal device or the second terminal device described in the foregoing method implementations, and the network device 1220 can implement functions of the network device described in the foregoing method implementations, which will not be repeated herein for the sake of simplicity.

Figure 13:
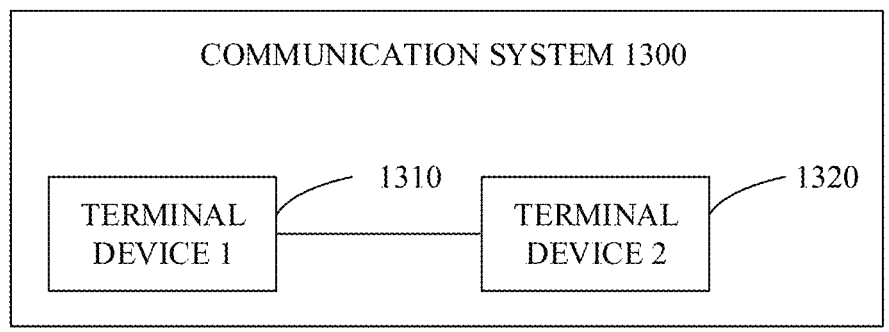
FIG. 13 is a schematic block diagram of a communication system according to other implementations.

FIG. 13 is a schematic block diagram of a communication system 1300 according to implementations. As illustrated in FIG. 13, the communication system 1300 includes a terminal device 1 1310 and a terminal device 2 1320.

The terminal device 1 1310 can implement functions of the first terminal device described in the foregoing method implementations, and the terminal device 2 1320 can implement functions of the second terminal device described in the foregoing method implementations, which will not be repeated herein for the sake of simplicity.

Implementations further provide a computer readable storage medium. The computer readable storage medium is configured to store computer programs.

The computer readable storage medium is applicable to the terminal device. The computer programs, when executed, are operable with a computer to implement the operations performed by the first terminal device or the second terminal device described in the foregoing method implementations, which will not be repeated herein for the sake of simplicity.

Alternatively, the computer readable storage medium is applicable to the network device of implementations. The computer programs, when executed, are operable with a computer to implement the operations performed by the network device described in the foregoing method implementations, which will not be repeated herein for the sake of simplicity.

Implementations further provide a computer program product. The computer program product includes computer program instructions.

The computer program product is applicable to the terminal device of implementations. The computer program instructions, when executed, are operable with a computer to implement the operations performed by the first terminal device or the second terminal device described in the foregoing method implementations, which will not be repeated herein for the sake of simplicity.

Alternatively, the computer program product is applicable to the network device of implementations. The computer program instructions, when executed, are operable with a computer to implement the operations performed by the network device described in the foregoing method implementations, which will not be repeated herein for the sake of simplicity.

Implementations further provide a computer program.

The computer program is applicable to the terminal device of implementations. The computer program, when executed by a computer, is operable with the computer to implement the operations performed by the first terminal device or the second terminal device described in the foregoing method implementations, which will not be repeated herein for the sake of simplicity.

Alternatively, the computer program is applicable to the network device of implementations. The computer program, when executed by a computer, is operable with the computer to implement the operations performed by the network device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A communication method for a sidelink (SL), comprising:
    allocating a first transmission resource, by a network device, to a first terminal device, wherein the first transmission resource is used for sending, by the first terminal device, first feedback information to a second terminal device, the first feedback information is feedback information in response to a first message sent by the second terminal device to the first terminal device, a symbol in which the first transmission resource is located is not used for transmitting data by the first terminal device to at least one third terminal device, and the first terminal device, the second terminal device, and the at least one third terminal device belong to a first group;
    wherein the first transmission resource is determined by the first terminal device from a first transmission resource set according to identifier information of the first terminal device, wherein the identifier information of the first terminal device comprises a member identifier of the first terminal device in the first group;
    wherein the symbol in which the first transmission resource is located is used for sending second feedback information to the second terminal device by the at least one third terminal device.

2. The method of claim 1, wherein the symbol in which the first transmission resource is located is not used for transmitting data by at least one fourth terminal device, and the at least one fourth terminal device is a terminal device in the first group other than the first terminal device.

3. The method of claim 2, wherein the symbol in which the first transmission resource is located is used for sending, by the at least one fourth terminal device, third feedback information to the second terminal device.

4. The method of claim 1, wherein allocating the first transmission resource, by the network device, to the first terminal device comprises:
sending, by the network device, indication information to the first terminal device, wherein the indication information is used to determine the first transmission resource.

5. The method of claim 4, wherein the indication information is carried in one of downlink control information (DCI) and radio resource control (RRC) signaling.

6. The method of claim 1, further comprising:
sending, by the network device, configuration information to the second terminal device, wherein the configuration information comprises a first transmission resource set, and the first transmission resource set comprises the first transmission resource.

7. The method of claim 1, further comprising:
sending, by the network device, index information to the first terminal device, wherein the index information is used to determine an index of the first transmission resource.

8. A network device, comprising:
a memory configured to store computer programs; and
a processor configured invoke and execute the computer programs stored in the memory, to allocate a first transmission resource to a first terminal device, wherein the first transmission resource is used for sending, by the first terminal device, first feedback information to a second terminal device, the first feedback information is feedback information in response to a first message sent by the second terminal device to the first terminal device, a symbol in which the first transmission resource is located is not used for transmitting data by the first terminal device to at least one third terminal device, and the first terminal device, the second terminal device, and the at least one third terminal device belong to a first group;
wherein the first transmission resource is determined by the first terminal device from a first transmission resource set according to identifier information of the first terminal device, wherein the identifier information of the first terminal device comprises a member identifier of the first terminal device in the first group;
wherein the symbol in which the first transmission resource is located is not used for transmitting data by at least one fourth terminal device, and the at least one fourth terminal device is a terminal device in the first group other than the first terminal device.

9. The network device of claim 8, wherein the at least one third terminal device is at least one terminal device in the first group, which is configured to send second feedback information to the second terminal device in the symbol in which the first transmission resource is located.

10. The network device of claim 8, wherein the symbol in which the first transmission resource is located is used for sending, by the at least one fourth terminal device, third feedback information to the second terminal device.

11. The network device of claim 8, further comprising:
a transceiver configured to send indication information to the first terminal device, wherein the indication information is used to determine the first transmission resource.

12. The network device of claim 11, wherein the indication information is carried in one of downlink control information (DCI) and radio resource control (RRC) signaling.

13. The network device of claim 8, further comprising:
a transceiver configured to send configuration information to the second terminal device, wherein the configuration information comprises a first transmission resource set, and the first transmission resource set comprises the first transmission resource.

14. The network device of claim 8, further comprising:
a transceiver configured to send index information to the first terminal device, wherein the index information is used to determine an index of the first transmission resource.

15. A terminal device, comprising:
a transceiver;
at least one processor; and
a memory storing instructions which, when executed by the at least one processor, cause the at least one processor to:
determine a first transmission resource from a first transmission resource set according to identifier information of the terminal device, wherein a symbol in which the first transmission resource is located is not used for transmitting data by the terminal device to at least one third terminal device or a second terminal device, wherein the terminal device, the second terminal device, and the at least one third terminal device belong to a first group, wherein the identifier information of the first terminal device comprises a member identifier of the first terminal device in the first group; and
the instructions, when executed by the at least one processor, cause the transceiver to:
receive a first message sent by the second terminal device; and
send to the second terminal device first feedback information in response to the first message, by using the first transmission resource;
wherein the symbol in which the first transmission resource is located is not used for transmitting data by at least one fourth terminal device, and the at least one fourth terminal device is a terminal device in the first group other than the terminal device;
wherein the symbol in which the first transmission resource is located is used for sending, by the at least one fourth terminal device, third feedback information to the second terminal device.

16. The terminal device of claim 15, wherein the at least one third terminal device is at least one terminal device in the first group, which sends second feedback information to the second terminal device in the symbol in which the first transmission resource is located.

* * * * *